US012650974B2

(12) United States Patent
Bansal et al.

(10) Patent No.:    US 12,650,974 B2
(45) Date of Patent:    Jun. 9, 2026

(54) AUTOMATICALLY AND INTELLIGENTLY CREATING JOURNAL ENTRIES TO SOLVE MISMATCHES IDENTIFIED VIA THE INTERCOMPANY ELIMINATION REPORTING PROCESS

(71) Applicant: Oracle International Corporation, Redwood Shores, CA (US)

(72) Inventors: Pradeep Bansal, Karnataka (IN); Margaret Reed, Paducah, KY (US); Sunil Sahu, Karnataka (IN); John D. Clark, Jr., Pepperell, MA (US); Varghese Mathew, Karnataka (IN); Thomas Lefebvre, Danbury, CT (US); Tim Gaumont, Mesa, AZ (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/170,294

(22) Filed: Apr. 4, 2025

(65) Prior Publication Data

US 2026/0064660 A1    Mar. 5, 2026

Related U.S. Application Data

(60) Provisional application No. 63/691,235, filed on Sep. 5, 2024.

(51) Int. Cl.
G06F 16/23    (2019.01)

(52) U.S. Cl.
CPC ................................ G06F 16/2365 (2019.01)

(58) Field of Classification Search
CPC ...... G06F 30/27; G06F 2113/10; G06F 30/13; G06F 9/541; G06F 16/24578;
(Continued)

(56) References Cited

U.S. PATENT DOCUMENTS

| | | | |
|---|---|---|---|
| 9,926,593 B2 * | 3/2018 | Ehrich | ................... C12Q 1/686 |
| 10,885,452 B1 * | 1/2021 | Garg | ........................ G06N 7/01 |

(Continued)

OTHER PUBLICATIONS

AMR, "Experimenting The Bayesian Way", https://blogs.oracle.com/ai-and-datascience/post/experimenting-the-bayesian-way, Jul. 23, 2018.
(Continued)

*Primary Examiner* — MD I Uddin

(74) *Attorney, Agent, or Firm* — Invoke

(57)    ABSTRACT

Systems, methods, and computer-readable media are provided for automatically and intelligently creating journal entries, such as journal entries to solve mismatches identified via the intercompany elimination reporting process. In an example, a machine learning model is trained to generate journal entries such as journal entries based on certain characteristics of historical journal entries associated with historical discrepancies. The trained machine learning model may be used, for example, to automatically generate a journal entry by recording a ledger acknowledging a discrepancy between a first data entry of a first entity and a second data entry of a second entity. The journal entry automatically generated using the machine learning model may reconcile the discrepancy, for example, by recording the ledger in alignment with the first data entry of the first entity or in alignment with the second data entry of the second entity.

19 Claims, 10 Drawing Sheets

(58) Field of Classification Search
CPC .... G06F 16/285; G06F 16/2365; G06F 16/35;
G06F 16/353; G06F 16/93
USPC .............. 707/673, 691, 737, 739, 741, 776,
707/999.002, 999.003, 17.046
See application file for complete search history.

(56) References Cited

U.S. PATENT DOCUMENTS

| | | | | |
|---|---|---|---|---|
| 11,704,576 | B1 * | 7/2023 | McEntire ................ | G06F 16/29 |
| | | | | 706/12 |
| 2024/0374202 | A1 * | 11/2024 | Krishnaprasad ..... | A61B 5/0077 |
| 2025/0349399 | A1 * | 11/2025 | Crabtree ................ | G06F 21/62 |

OTHER PUBLICATIONS

Danielkievych, "Use Machine Learning Techniques to Grow Your Business", https://forbytes.com/blog/main-machine-learning-techniques/, Jun. 16, 2025.
Kramer, "Introduction to Bayesian Inference", https://blogs.oracle.com/ai-and-datascience/post/introduction-to-bayesian-inference, Dec. 13, 2016.
Oracle, "Machine Learning for SQL Use Cases", Database, Oracle, Machine Learning, OML4SQL, Release 23, https://docs.oracle.com/en/database/oracle/machine-learning/oml4sql/23/mlsql/confidence1.html, retrieved on Sep. 16, 2025.

* cited by examiner

100A

Start

Train a machine learning model to generate journal entries that reconcile discrepancies
104

Access a first data structure from a first source comprising a first plurality of data entries against one or more first entities and one or more second entities, wherein the first data structure and the first source are associated with the one or more first entities
106

Access a second data structure from a second source comprising a second plurality of data entries against one or more third entities and one or more fourth entities, wherein the second data structure and the second source are associated with the one or more third entities
108

Automatically detect a first discrepancy between one or more first data entries of the first plurality of data entries and one or more second data entries of the second plurality of data entries and a second discrepancy between one or more other first data entries of the first plurality of data entries and one or more other second data entries of the second plurality of data entries
110

Receive a selection of a first option to analyze discrepancies between the first plurality of data entries and the second plurality of data entries
112

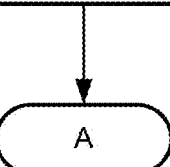

A

In response to the selection of the first option to analyze the discrepancies and without selection of individual discrepancies, use the machine learning model to automatically generate a first journal entry that reconciles the first discrepancy by recording a first ledger acknowledging, to the one or more first entities, the first discrepancy in alignment with the one or more second entities, and automatically cause display of a second option to confirm generation of the first journal entry and a third option to roll back generation of the first journal entry, wherein selection of the third option is operable to cause deletion of the first journal entry as if the first journal entry never existed in the first data structure
114

Automatically generate a second journal entry that reconciles the second discrepancy by recording a second ledger acknowledging the second discrepancy in alignment with the one or more other first data entries
116

In response to a selection of the second option to confirm generation of the first journal entry, automatically persist the first journal entry in the first data structure
118

Optionally automatically post the first journal entry to adjust balances in the first data structure if there are no additional fields to be populated for a type of the first journal entry
120

End

User
202

Data Management System
204

User Interface
206

Database
216

Journal Entry Creation Triggering Logic
208

Journal Entry Baseline Value Prediction Logic
210

Second Machine Learning Model
214

First Machine Learning Model
212

Figure 4:
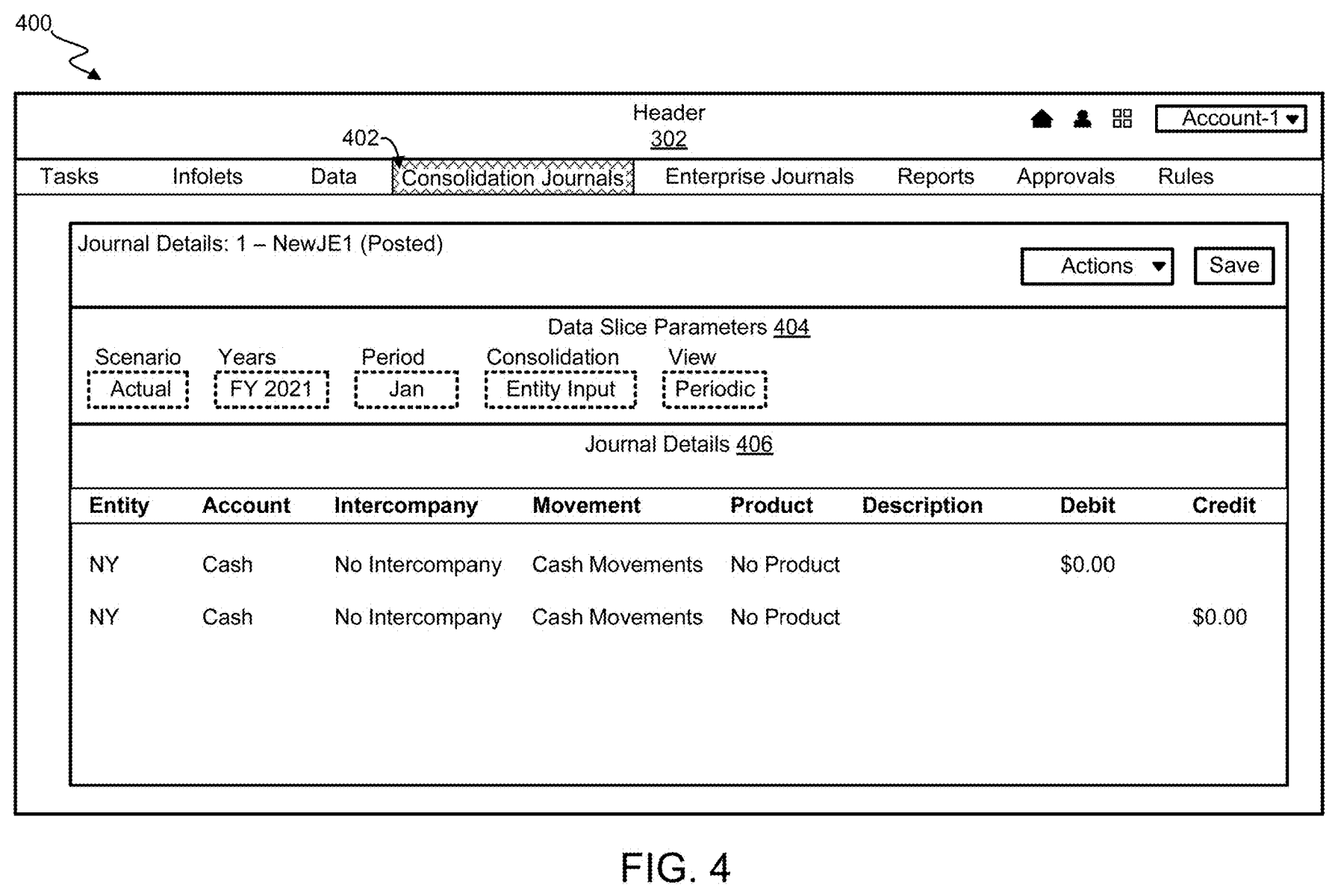

400

| Tasks | Infolets | Data | Consolidation Journals | Enterprise Journals | Reports | Approvals | Rules |
|---|---|---|---|---|---|---|---|

Header
302

◆ ♠ 88    Account-1 ▼

402

Journal Details: 1 – NewJE1 (Posted)

Actions ▼    Save

Data Slice Parameters 404

| Scenario | Years | Period | Consolidation | View |
|---|---|---|---|---|
| Actual | FY 2021 | Jan | Entity Input | Periodic |

Journal Details 406

| Entity | Account | Intercompany | Movement | Product | Description | Debit | Credit |
|---|---|---|---|---|---|---|---|
| NY | Cash | No Intercompany | Cash Movements | No Product | | $0.00 | |
| NY | Cash | No Intercompany | Cash Movements | No Product | | | $0.00 |

AUTOMATICALLY AND INTELLIGENTLY CREATING JOURNAL ENTRIES TO SOLVE MISMATCHES IDENTIFIED VIA THE INTERCOMPANY ELIMINATION REPORTING PROCESS

CROSS REFERENCE TO RELATED APPLICATION(S)

This application claims the benefit of U.S. Provisional Patent Application No. 63/691,235, filed on Sep. 5, 2024. The entire disclosure of the aforementioned application is incorporated by reference herein in its entirety for all purposes.

BACKGROUND

Reconciling differences between accounts receivable and accounts payable is essential for maintaining accurate financial records in a business. Accounts receivable represent the money owed to the company by its customers, while accounts payable are the amounts the company owes to its suppliers. Discrepancies between these accounts can occur due to timing differences, data entry errors, or miscommunication. For example, a payment received might not yet be recorded in accounts receivable, leading to an imbalance. Addressing these discrepancies ensures that the company has a clear understanding of its cash flow and financial obligations.

The reconciliation process involves carefully reviewing financial records, such as invoices, payment receipts, and contracts, to identify and correct any inconsistencies. Employees may often investigate the root causes of discrepancies, which may require communication with customers or suppliers and adjustments to accounting entries. Reconciling these differences is important for accurate financial reporting and effective financial management.

BRIEF SUMMARY

In some embodiments, a computer-implemented method includes automatically and intelligently creating journal entries to solve mismatches identified via the intercompany elimination reporting process. The method includes training a machine learning model to generate journal entries based on certain characteristics of historical journal entries associated with historical discrepancies. The trained machine learning model may be used, for example, to automatically generate a journal entry by recording a ledger acknowledging a discrepancy between a first data entry of a first entity and a second data entry of a second entity. The journal entry automatically generated using the machine learning model may reconcile the discrepancy, for example, by recording the ledger in alignment with the first data entry of the first entity or in alignment with the second data entry of the second entity.

In a particular embodiment, a computer-implemented method comprises training a machine learning model to generate journal entries that reconcile discrepancies based at least in part on certain characteristics of historical journal entries associated with historical discrepancies. The computer-implemented method further comprises accessing a first data structure from a first source comprising a first plurality of data entries against one or more first entities and one or more second entities. The first data structure and the first source are associated with the one or more first entities. The computer-implemented method further comprises accessing a second data structure from a second source comprising a second plurality of data entries against one or more third entities and one or more fourth entities. The second data structure and the second source are associated with the one or more third entities. The computer-implemented method further comprises automatically detecting, based at least in part on one or more first characteristics of one or more first data entries of the first plurality of data entries and one or more second characteristics of one or more second data entries of the second plurality of data entries, a first discrepancy between the one or more first data entries and the one or more second data entries and a second discrepancy between one or more other first data entries of the first plurality of data entries and one or more other second data entries of the second plurality of data entries. The computer-implemented method further comprises receiving a selection of a first option to analyze discrepancies between the first plurality of data entries and the second plurality of data entries. The computer-implemented method further comprises in response to the selection of the first option to analyze the discrepancies and without selection of individual discrepancies, using the machine learning model to automatically generate a first journal entry that reconciles the first discrepancy by recording a first ledger acknowledging, to the one or more first entities, the first discrepancy in alignment with the one or more second data entries, and automatically cause displaying of a second option to confirm generation of the first journal entry and a third option to roll back generation of the first journal entry. The computer-implemented method further comprises automatically generating a second journal entry that reconciles the second discrepancy by recording a second ledger acknowledging the second discrepancy in alignment with the one or more other first data entries. Selection of the third option is operable to cause deletion of the first journal entry as if the first journal entry never existed in the first data structure. The computer-implemented method further comprises in response to a selection of the second option to confirm generation of the first journal entry, automatically persisting the first journal entry in the first data structure.

In a further embodiment, the one or more third entities are the one or more second entities, and wherein the one or more fourth entities are the one or more first entities.

In the same or a different further embodiment, the one or more third entities are the one or more second entities, and the one or more fourth entities are different than the one or more first entities and the one or more second entities.

In another embodiment that extends the particular embodiment or any further embodiment, the one or more first entities comprise a plurality of first entities having a same parent entity, and the first data structure is maintained for the parent entity.

In another embodiment that extends the particular embodiment or any further embodiment, the automatically generating the second journal entry is by using the machine learning model.

In another embodiment that extends the particular embodiment or any further embodiment, the training the machine learning model comprises training the machine learning model to learn relationships between journal entries associated with adjacent reporting periods.

In another embodiment that extends the particular embodiment or any further embodiment, the training the machine learning model is further based on currency exchange rates at historical times associated with the historical journal entries.

In another embodiment that extends the particular embodiment or any further embodiment, the certain characteristics of the historical journal entries include a characteristic that indicates whether a respective historical journal entry was accepted or rejected.

In another embodiment that extends the particular embodiment or any further embodiment, the certain characteristics of the historical journal entries include a characteristic that indicates an extent to which a respective historical journal entry is modified prior to being persisted in the first data structure or the second data structure.

In another embodiment that extends the particular embodiment or any further embodiment, the certain characteristics of the historical journal entries include a characteristic that indicates a seasonality of the historical journal entries.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

As used herein, the terms "first," "second," "third," "fourth," etc. are used as naming conventions to refer to separate items in a set of items. These naming conventions do not imply ordering unless such ordering is explicitly noted using language specific to ordering, such as "before" or "after," or unless such ordering is required to attain the expressly recited functionality, such as generating an item and later accessing the generated item.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIGS. 1A and 1B illustrate a flow chart of an example process that identifies mismatches in intercompany financial reports and recommends the creation of a journal entry to reconcile identified mismatches.

FIG. 4 shows an example interface showing a suggested journal entry that is automatically created in the platform for resolving a mismatch between two entities.

DETAILED DESCRIPTION

Figure 2:
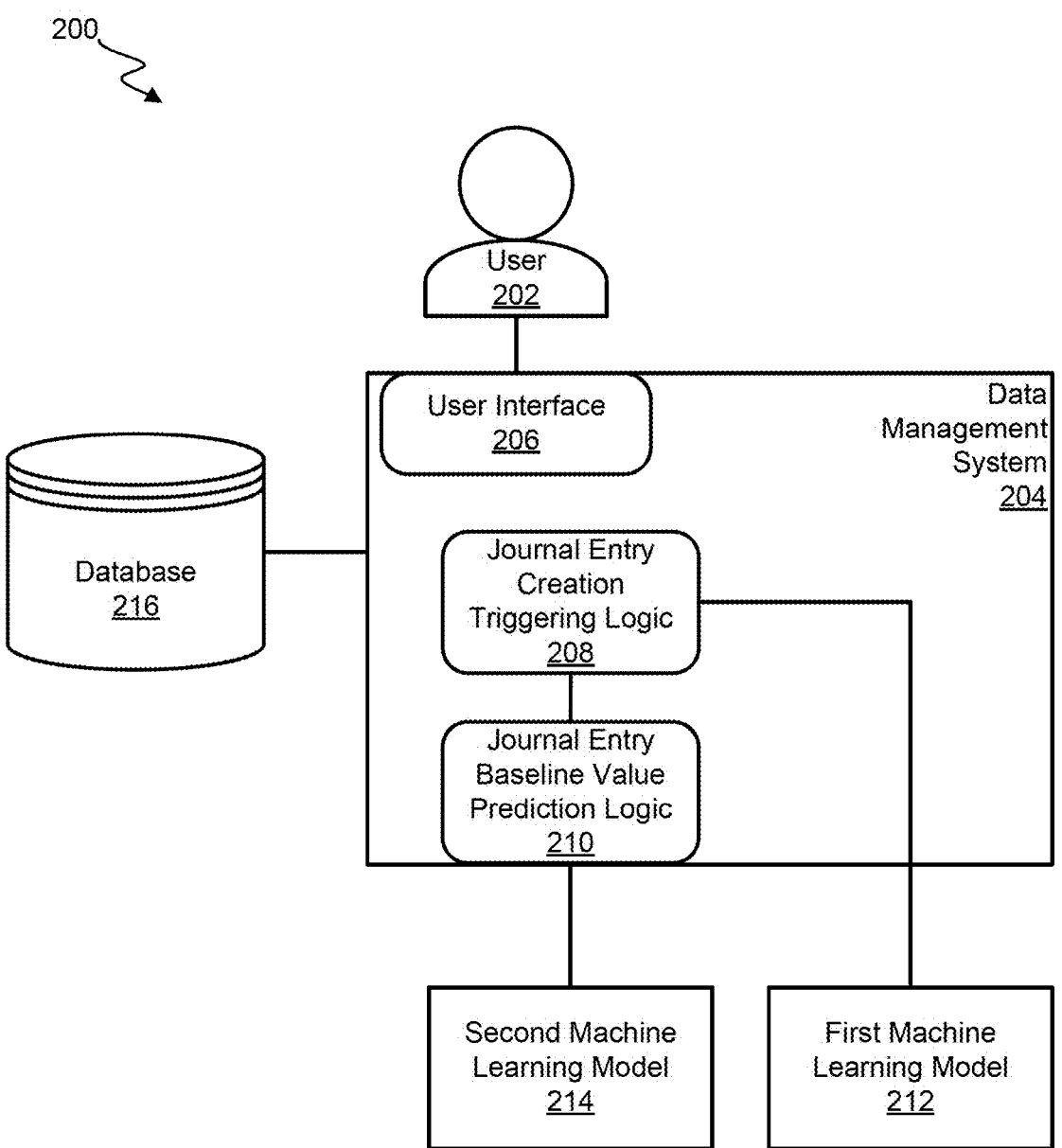
FIG. 2 illustrates a system diagram showing an example cloud infrastructure that may use historical user data and access to a database of financial reports to both identify mismatches in financial reports and make recommendations for journal entries to reconcile those differences.

A description of automatically creating journal entries to solve mismatches identified via the intercompany elimination reporting process is provided in the following sections:

USING ARTIFICIAL INTELLEGENCE AND MACHINE LEARNING TO PREDICT THE CREATION OF JOURNAL ENTRIES IN BUSINESS SOFTWARE.

CREATION OF A SPECIFIC BUSINESS JOURNAL ENTRY

EXAMPLE INTERCOMPANY REPORT SHOWING A MISMATCH

CREATION OF JOURNAL ENTRY TO RESOLVE MISMATCH

INTEGRATION OF MISMATCH RECONCILIATION INTO THE DATA MANAGEMENT SYSTEM

COMPUTER SYSTEM ARCHITECTURE

The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

An intercompany report is a financial document that details transactions between different legal entities, such as different legal entities within the same corporate group (e.g. subsidiaries, divisions, or branches under a common parent company) or different companies altogether. These transactions might include the sale of goods, provision of services, transfer of assets, or internal financing. The primary purpose of intercompany reports is to promote accurate recording and reconciliation of transactions across the various entities involved, which is crucial for the preparation of consolidated financial statements. Without precise intercompany reporting, the financial health of the entire corporate group or partnership between companies can be misrepresented, leading to potential issues with compliance, audits, and strategic decision-making.

Reconciling accounts receivable versus accounts payable in an intercompany report promotes the integrity of the financial statements. Accounts receivable represents money owed to one entity within the corporate group by another, while accounts payable represents the corresponding obligation of the other entity to pay that amount. Accurate reconciliation ensures that these internal transactions balance out across the group, preventing discrepancies that could distort the consolidated financial picture. If one entity records a receivable without the corresponding payable being recorded by the other entity, it can lead to errors that ripple through the corporate financials, affecting everything from cash flow analysis to regulatory filings.

However, the reconciliation process is often a time-consuming and/or resource-consuming burden. Each intercompany transaction is carefully reviewed and matched to ensure that both entities involved have recorded the transaction consistently. This task is complicated by factors such as different accounting systems, currencies, or financial practices used by each entity, as well as potential timing differences in when transactions are recorded. The need for precise alignment across multiple entities makes the reconciliation process labor-intensive and prone to delays, especially in large corporations or partnerships with numerous intercompany transactions. The complexity of managing these tasks can strain financial teams and divert resources from other critical activities.

Despite the significant time and effort required, reconciling intercompany accounts promotes overall financial stability and transparency of a corporate group or partnership. Inaccurate or incomplete reconciliation can lead to material misstatements in consolidated financial reports, which can have serious consequences, including regulatory penalties, audit issues, and misguided business decisions. Embodiments disclosed herein provide a technical solution of using artificial intelligence and machine learning to create and recommend journal entries in a data management system.

FIGS. 1A and 1B show a flowchart illustrating a process, comprising sub-processes 100A and 100B, for using artificial intelligence and machine learning to create and recommend journal entries according to at least some embodiments. The processes 100A and 100B may be performed by a data management system. A data management system may include any computing system configured to collect, store, organize, process, analyze, and/or otherwise manage data.

Sub-process 100A starts in block 104, where an example data management system trains a machine learning model to generate reconciliation entries (e.g., journal entries) that reconcile discrepancies. The training at block 104 may be based at least in part on certain characteristics of historical journal entries associated with historical discrepancies. For example, the machine learning model may be trained to recognize patterns where certain discrepancies (e.g., threshold difference between account payables and account receivables of intercompany accounts, etc.) tend to be reconciled by certain types of journal entries. As another example, the machine learning model may be trained to predict whether a journal entry that reconciles a discrepancy between a first entity and a second entity is more likely to be approved if it is in alignment with the first entity or if it is in alignment with the second entity (e.g., historical journal entries that are eventually approved may tend to credit discrepancies to entity A and debit them from entity B, etc.). As yet another example, the machine learning model may be trained to detect patterns where certain events or other data characteristics are correlated with generation of journal entries (e.g., day of week, time of year, discrepancies due to previous reconciliation adjustments introduced in a previous or adjacent reporting period, changes in currency exchange rates, etc.). Thus, the machine learning model can be trained to identify various patterns in historical data. The trained machine learning model can then be used to intelligently or proactively predict that a new journal entry should be created when similar data patterns are detected.

In some examples, training the machine learning model at block 104 comprises the data management system training the machine learning model to learn relationships between journal entries associated with adjacent reporting periods. For example, a discrepancy may occur due to different reporting processes or deadlines at two different entities. In this scenario, a first journal entry may be generated in a first reporting period to address the discrepancy. Further, in this scenario, an opposite discrepancy may occur in the subsequent reporting period due to the delayed entry that caused the discrepancy of the first reporting period. Thus, the machine learning model may be trained to identify such pattern of discrepancies associated with adjacent reporting periods and thus predict that another journal entry may be needed in a next reporting period between those two entities.

In some examples, training the machine learning model at block 104 may be further based on currency exchange rates at historical times associated with the historical journal entries. For example, the machine learning model may learn that a threshold change in currency exchange rates is expected to cause discrepancies between two particular entities that use a currency pair affected by the change in the currency exchange rates, and thus automatically generate a journal entry for those two entries to reconcile the discrepancy associated with currency exchange rates.

In some examples, the certain characteristics of the historical journal entries include a characteristic that indicates whether a respective historical journal entry was accepted or rejected. For example, if a certain type of journal entry is more likely to be accepted than another type of journal entry (e.g., where a ledger is recorded against entity A is more likely to be accepted than a ledger recorded against entity B), the machine learning model can learn this characteristic and thus recommend future journal entries for reconciling similar discrepancies (e.g., between entity A and entity B) by recommending charging the similar discrepancies against the more likely entity to be accepted.

In some examples, the certain characteristics of the historical journal entries include a characteristic that indicates an extent to which a respective historical journal entry is modified prior to being persisted in the first data structure or the second data structure. For example, in a scenario where previously recommended journal entries that are similar to a potential journal entry being considered to address a discrepancy were modified significantly before being posted, the machine learning model may recommend a different type of journal entry that is less likely to require significant modifications (e.g., by choosing field values that are likely to be more accurate, etc.).

In some examples, the certain characteristics of the historical journal entries include a characteristic that indicates a seasonality of the historical journal entries. For example, the machine learning model may learn that a certain type of journal entry is likely to be posted at a certain time of year, and thus the data management system may recommend a similar type of journal entry if it detects a similar discrepancy at that certain time of year. Seasonal patterns may be analyzed and detected at the hourly level, shift level, daily level, weekly level, pay period level, monthly level, quarterly level, yearly level, or any other level of periodic variation.

In block 106, the data management system accesses a first data structure from a first source comprising a first plurality of data entries against one or more first entities and one or more second entities. The first data structure and the first source are associated with the one or more first entities. For example, the first data structure may store details of a financial statement, net income calculation, accounts payable amounts, accounts receivable amounts, or any other financial data from the one or more first entities. In some instances, the first data structure may store multi-dimensional data (e.g., data organized to distinguish between different accounting periods, fiscal years, and/or other data slices). In other instances, the first data structure may include data associated with a particular data slice in the multi-dimensional data.

In some examples, the one or more first entities comprise a plurality of first entities having a same parent entity, and the first data structure is maintained for the parent entity. For example, consolidated financial data from two different first entities may be stored in the first data structure.

In block 108, the data management system accesses a second data structure from a second source comprising a second plurality of data entries against one or more third entities and one or more fourth entities. The second data structure and the second source are associated with one or more third entities.

In some examples, the one or more third entities are the one or more second entities, and the one or more fourth entities are the one or more first entities. For example, intercompany imbalances can be reconciled by retrieving data (e.g., accounts receivable) from one entity and its counterpart data (e.g., accounts payable) from the other entity.

In some examples, the one or more third entities are the one or more second entities, and the one or more fourth entities are different than the one or more first entities and the one or more second entities. For example, an imbalance between a first entity and a second entity may be due to an incorrect entry between the second entity and a different entity (e.g., fourth entity). Thus, by retrieving corresponding financial data from the first, second, and fourth entities, additional discrepancies can be identified and/or reconciled. In this example, 3-way journal and balancing are involved. In various other examples, N-way journal and balancing may be performed with a variety of discrepancies resolved by a variety of transactions that occurred between K entities, where K is any number less than or equal to N.

In block 110, the data management system automatically detects a first discrepancy between one or more first data entries of the first plurality of data entries and one or more second data entries of the second plurality of data entries and a second discrepancy between one or more other first entries of the first plurality of entries and one or more other second entries of the second plurality of entries. The detection of the first discrepancy and the second discrepancy at block 110 may be based at least in part on one or more first characteristics of the one or more first data entries, one or more second characteristics of the one or more second data entries, and so on. For example, the data management system may detect discrepancies between data entries by using heuristics, triggered conditions, and/or another machine learning model to detect the discrepancies based at least in part on historical data entries having certain characteristics in common with labeled historical discrepancies.

In block 112, the data management system receives a selection of an option to analyze discrepancies between the first plurality of entities and the second plurality of entities.

FIG. 1B continues from sub-process 100A to sub-process 100B. In block 114, in response to the selection of the option to analyze the discrepancies at block 112 and without selection of individual discrepancies, the data management system uses the machine learning model to automatically generate a first journal entry that reconciles the first discrepancy by recording a first ledger acknowledging, to the one or more first entities, the first discrepancy in alignment with the one or more second entities, and the data management system automatically causes display of a second option to confirm generation of the first journal entry and a third option to roll back generation of the first journal entry. Selection of the third option is operable to cause deletion of the first journal entry as if the first journal entry never existed in the first data structure.

In block 116, the data management system automatically generates a second journal entry that reconciles the second discrepancy by recording a second ledger acknowledging the second discrepancy in alignment with the one or more other first data entries. In other words, the first discrepancy and the second discrepancy may be resolved in different ways, against different entities, depending on the data patterns detected by the machine learning model or stored heuristics or triggered conditions. For instance, in a scenario where a journal entry that reconciles a discrepancy against entity A (e.g., by debiting an entity A account) is more likely to be approved (e.g., based on historical data) than one that reconciles it against entity B, then the data management system may propose (e.g., generate) the journal entry with data fields that recommend reconciling the discrepancy against entity A, and so on. Thus, in some examples, automatically generating the second journal entry at block 116 is by using the machine learning model.

In block 118, in response to a selection of the second option to confirm generation of the first journal entry, the data management system automatically persists the first journal entry in the first data structure. For example, a user can select the second option to approve and/or post the first journal entry in the first data structure.

In block 120, the data management system optionally automatically posts the first journal entry to adjust balances in the first data structure if there are no additional fields to be populated for a type of the first journal entry. For example, the data management system may automatically trigger the functionality of the second option if sufficient information is predicted by the machine learning model (e.g., and/or the predicted information has at least a predetermined confidence level of accuracy) to complete the necessary fields for posting the first journal entry automatically.

FIG. 2 depicts a sample architecture for a system 200 to execute the methods and techniques pertaining to at least some embodiments. As shown, User 202 may interact with a User Interface 206 to enter data or view a recommendation from data management system 204. Data from database 214 and/or data changed via user input from user interface 206 may trigger one or more conditions as determined by journal entry creation triggering logic 208, optionally using heuristics, triggered conditions, user input, and/or first machine learning model 212 to determine if historical patterns based on the data conditions often led to the creation of a journal entry. Journal entry creation triggering logic may, for example, determine if there are any data discrepancies or any other data patterns that, historically according to the first machine learning model 212 that analyzes patterns in the historical data and/or user feedback on whether past attempts at automatically creating journal entries were positive (accepted and saved, optionally with minor adjustments) or negative (deleted, discarded, or significantly modified).

If journal entry creation triggering logic determines to create a journal entry, entry baseline value prediction logic may use one or more second machine learning models 214 to determine one or more values to store in the journal entry. For example, the discrepancy amount may be stored in the journal entry, and the discrepancy may be adjusted in favor of one entity or another entity involved in the discrepancy depending on how historical discrepancies having similar characteristics have been resolved.

The data management system 204 may cause the automatically created journal entry to be displayed to the user via user interface 206. If accepted, the journal entry may be saved in database 216, which may be associated with one or the other entity involved in the transaction on which the journal entry is reporting. In some embodiments, the journal entry is saved against databases of both entities involved in the journal entry, with a consistent resolution of the discrepancy in favor of one entity or the other entity.

Using Artificial Intelligence and Machine Learning to Predict the Creation of Journal Entries in Business Software In some embodiments, machine learning tools are used to automatically detect when a journal entry may be needed. To predict when a user may need to create a journal entry, past user data is curated and employed to create a model, or otherwise combined with machine learning tools to generate the predictions. This may be achieved by examining the action of the user, via interactions with the business software through button clicks and text entries. The selected algorithm may be any suitable machine learning tool that uses historical data to predict future actions. Several such tools are described below, but it will be appreciated that additional tools may be suitable.

Collaborative Filtering: This algorithm is widely used in recommendation systems and is based on the idea of making recommendations by finding similarities between users or items. There are two main types:

1). User-Based Collaborative Filtering: This approach looks for users with similar behavior or preferences and recommends items that similar users have liked or interacted with in the past.

2). Item-Based Collaborative Filtering: This approach focuses on finding similarities between items based on user interactions, recommending items that are similar to those the user has interacted with before.

Content-Based Filtering: This algorithm recommends items based on the features of the items and the user's previous interactions. It analyzes the content of items (such as keywords, categories, or descriptions) and suggests items with similar attributes to those that the user has liked or interacted with in the past.

Matrix Factorization: This is a popular technique in collaborative filtering, particularly in scenarios with large datasets, like in Netflix or Amazon recommendations. It involves breaking down a large matrix (e.g., users vs. items) into lower-dimensional matrices, capturing the latent factors or patterns in the data that can be used to predict user preferences.

Deep Learning Models: Neural networks, particularly deep learning models, can be used for more complex recommendation tasks. Three examples include:

1). Recurrent Neural Networks (RNNs): These are often used for sequence-based recommendations, where the order of user actions matters, such as in recommending the next song in a playlist.

2). Convolutional Neural Networks (CNNs): While CNNs are typically associated with image data, they can also be adapted for text and other types of structured data to find patterns and make recommendations.

3). Autoencoders: These are used to reduce dimensionality and learn efficient representations of data, which can then be used for recommendations.

Association Rule Learning: Algorithms like Apriori or Eclat are used to discover relationships between items in large datasets. These rules can then be used to recommend items that are often bought together or used together.

Reinforcement Learning: In some recommendation systems, reinforcement learning algorithms are used to continuously adapt recommendations based on user feedback. The system learns a policy that maximizes a cumulative reward by suggesting actions that are likely to lead to positive user responses.

Hybrid Models: Many modern recommendation systems combine several of the above approaches to improve accuracy and robustness. For example, a hybrid model might combine collaborative filtering with content-based filtering to leverage both user-item interactions and item features.

Each of these algorithms has unique strengths and is suited to different types of recommendation scenarios. It will be appreciated that this list serves solely as an example that additional tools are in existence or being routinely developed to achieve the same end result.

In business operations, various events can lead to the creation of journal entries in business software. And historical data or meta data associate with these events may be used by the machine learning tools. Common events that may trigger the creation of journal entry by a user include the recording of routine operational activities, such as inventory management, project updates, customer interactions, or financial transactions to name a few. For instance, when a company receives new inventory, a journal entry might be created to update stock levels and track the associated costs. Prior to the journal entry's creation by a user, the business software utilized by the company may record that the user recently checked the inventory status and that it had changed compared to the last time it was checked by that user. In this example, the machine learning software may learn to create a journal entry associated with changes in inventory. Similarly, when a project milestone is achieved, a journal entry could document the progress, resource usage, and any associated billing.

Another key event that prompts the creation of journal entries is the period-end review process. At the end of each operational cycle—be it monthly, quarterly, or annually—businesses finalize various aspects of their operations. This could include adjusting project timelines, updating employee performance metrics, or consolidating customer feedback. These operational adjustments are documented as journal entries, which then feed into broader reports that inform decision-making and strategic planning.

Interdepartmental or intercompany activities also frequently lead to the creation of journal entries, particularly in complex organizations. For example, when one department within a company transfers resources or data to another, a journal entry might be created to record the transaction and ensure that all parties involved have accurate records. Similarly, in a corporate group with multiple subsidiaries, intercompany data transfers, resource sharing, or collaborative projects are often documented through journal entries, ensuring that all entities have aligned records and can accurately report their activities.

Finally, events such as audits, compliance checks, or strategic decisions can also trigger the creation of journal entries in business software. During an audit, for instance, there might be a need to document procedural changes or compliance updates, leading to the creation of relevant journal entries. Likewise, strategic decisions-such as launching a new product line, restructuring a team, or shifting market focus-often require detailed documentation of the planning and execution phases. Journal entries serve as a tool in capturing these events, ensuring that all aspects of the business are recorded, analyzed, and communicated effectively across the organization.

It will be appreciated that various embodiments, the tools and techniques described herein will use the historical user data described above during manual journal entry creation to train artificial intelligence software to create journal entries automatically to increase speed and efficiency within a business's operations. In addition to increasing efficiency, the automatic creation of journal entries may also serve as a proof checking or insurance against a user forgetting or neglecting to create a journal entry when a journal entry is necessary.

Creation of a Specific Business Journal Entry

As described above, in some embodiments a machine learning tool may be used to predict when a journal entry may be created. However, not all journal entries are identical in business management software, and such software may offer many unique categories of journal entries. Below is a brief list of the types of journal entries available in the Oracle Cloud Enterprise Performance Management (EPM) Platform. However, it will be appreciated that additional journal entry types may be included and journal entries from other business management platforms including SAP Analytics Cloud (SAC), Workday Adaptive Planning, Anaplan, IBM Planning Analytics, OneStream, Tagetik, Vena Solutions, and Jedox.

Different types of journal entries are used to handle various financial and operational scenarios, each serving a specific purpose and triggered by distinct business events. Standard journals are commonly used for recording regular manual financial transactions, such as correcting errors or reclassifying entries. These may be triggered by day-to-day activities that require adjustments, like fixing an incorrect entry made during the initial posting. In contrast, recurring journal entries are designed to automate entries that need to be posted regularly over multiple periods, such as monthly rent payments or asset depreciation. These journal entries are set up once and automatically post in each period, making them ideal for ongoing, repetitive transactions.

Auto-reversing journal entries are used when there is a request to automatically reverse an entry in the following period, often used for temporary adjustments like accruals that need to be reversed once the actual payment is made. When transactions involve multiple currencies, multi-currency journal entries are used to ensure accurate financial reporting by handling currency conversions, such as when a company makes purchases in a foreign currency but reports in its base currency.

For tracking non-financial data alongside financial transactions, statistical journal entries are used and may be triggered by a request to record metrics like production volumes or hours worked for performance analysis. Allocations journal entries are employed when costs or revenues need to be distributed across different departments or business units, such as when allocating IT expenses based on usage. Intercompany journal entries are essential for recording transactions between different entities within the same corporate group, ensuring that both sides of the transaction are accurately reflected in the financial records, especially during intercompany sales or transfers.

Finally, top-side journal entries may be used at the consolidation level, often triggered by consolidation processes or management decisions that involve adjustments at the group level, such as intercompany eliminations or tax provisions. These various journal types in Oracle EPM are vital for maintaining accurate financial records and providing comprehensive insights into different aspects of the business.

In some embodiments, the specific triggers that initiate a specific journal entry's creation by a user will also be associated with the specific type selected for creation by the machine learning tools. This feature reduces the time a user requires to create a journal entry de novo and the user specify the journal entry class to create.

In some embodiments the automated journal entry creation will be temporary, and the user will have the option to close the journal entry and delete any record of the journal entry. Thus, if the machine learning tools predict that a journal entry should be created, but the data management system receives input from the user rejecting the journal entry as proposed, the data management system may delete any record of the journal entry. Additionally, journal entries generated automatically as a result of the machine learning tools may have the same editable fields as standard journal entries created by the user. For both types of journal entries, the data management system supports editing fields for which a user has permission before saving and closing the journal entry.

Example Intercompany Report Showing a Mismatch

Figure 3:
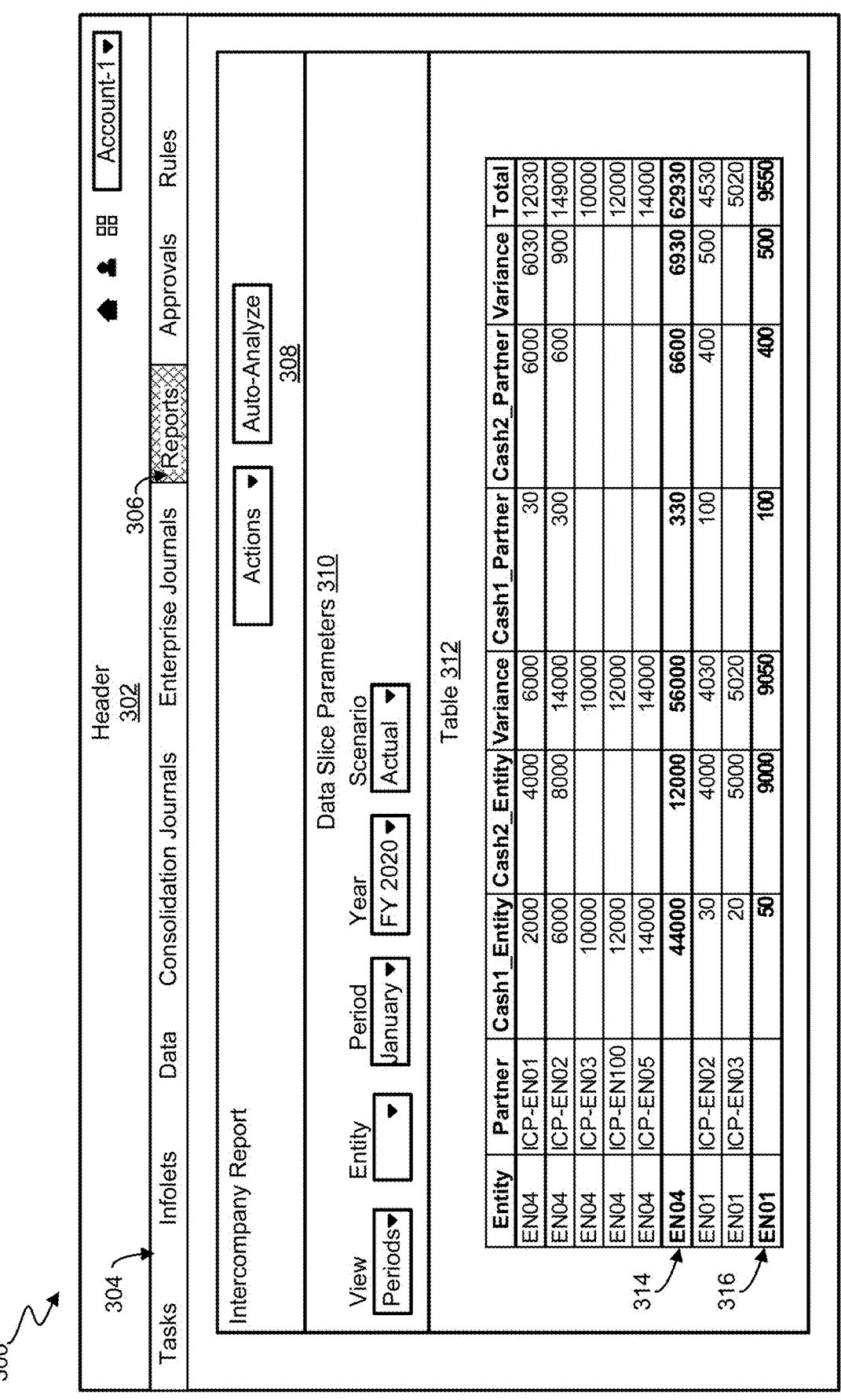
FIG. 3 illustrates a sample intercompany financial report.

FIG. 3 shows an example user interface 300 displaying an example intercompany report that might serve as the basis for a financial reconciliation where mismatches (e.g., discrepancies) in accounts payable and accounts receivable are identified between two entities. The user interface 300 includes a header 302 which includes one or more user interface (UI) elements, a navigation bar 304 that includes a selected navigation page 306, a selectable input element 308, data slice parameters 310, and table 312. The header 302 includes information and/or UI elements associated with an application or user account of a user of the UI 300. The navigation bar 304 includes selectable links to navigate to various modules or application features. For example, selected navigation item 306 indicates that the user is currently using the 'Reports' feature. The input element 308 is a selectable option (e.g., first option at block 112 of process 100A) that a user can select (e.g., click a button) to instruct the data management system to automatically generate one or more journal entries or other reconciliation entries for one or more discrepancies in the report using the machine learning model (i.e., without necessarily identifying an individual discrepancy). The data slice parameters 310 indicates one or more parameters for selecting a data slice (e.g., view, period, year, scenario, etc.) for which the data in the table 312 is compiled in the report.

The first column of the table 312 (e.g., labeled 'Entity') identifies EN04 as the principal entity being examined. The second column of the table 312 (e.g., labeled 'Partner') identifies the trading partner of the entity. In the top row example, the partner is ICP_EN01 (Inter Company Partner Entity 01). In this example, the third and fourth columns (e.g., labeled 'Cash1_Entity' and 'Cash2_entity') each represent assets claimed by the first entity, EN04. The total claims or variance depicted in column 5 (e.g., labeled 'Variance') for the first entity are thus '6000'.

Continuing with the example of the top row, the partner entity (ICP_EN01) reports two assets against EN04. These are depicted as '30' and '6000' in columns 6 and 7 for a total variance of '6030'. Thus, between the two entities, EN04 and ICP_EN01, there is a total mismatch, or variance, of '12030' because the amounts are not offsetting.

The rows 314 and 316 represent totals of the various columns associated with a specific entity against all partners or entities. For example, row 314 shows the entity 'EN04' claims a total 'Cash1_entity' assets of 44000 against all the partners (e.g., ICP-EN01, ICP-EN02, ICP-EN03, ICP-EN100, and ICP-EN05), and so on. Similarly, row 316 shows the sums for entity 'EN01'.

In an intercompany report, when there is a mismatch between accounts receivable and accounts payable, accounts payable may be the source of the discrepancy for several reasons. One reason is the timing difference in recording transactions. When one entity sends an invoice, the entity promptly records it as an account receivable. However, the receiving entity might delay recording the invoice as an account payable due to internal processing times, approval procedures, or administrative delays. This timing difference can cause a temporary mismatch between the two accounts.

Another reason is the possibility of incomplete or missing entries on the accounts payable side. If an invoice is lost, overlooked, or not processed correctly, the invoice may never be recorded as a payable, even though the corresponding receivable has already been recorded by the other entity. This leads to a situation where accounts receivable reflect an amount that is not mirrored or offset in accounts payable, creating a mismatch.

Discrepancies in valuation or currency conversion also contribute to mismatches. In cases where intercompany transactions involve different currencies or complex valuation methods, the accounts payable side might not match the accounts receivable due to errors in currency conversion, incorrect application of exchange rates, or differences in how the transaction's value was calculated. If the conversion or valuation is not done accurately, the accounts payable might understate or overstate the amount owed.

Additionally, different accounting practices or systems used by entities within a corporate group can lead to inconsistencies in how transactions are recorded. For example, if one entity records a transaction on a cash basis while another uses accrual accounting, a mismatch can occur. Accounts payable is often more susceptible to such discrepancies due to the varying ways different entities handle their obligations. Overall, while both accounts receivable and accounts payable can be sources of mismatches, the accounts payable side tends to be more prone to delays, errors, and discrepancies in recording, making it a common source of mismatches in intercompany reports.

In some embodiments, stored heuristics, triggers, and/or a first machine learning model has access to financial ledgers and intercompany reports to automatically identify such mismatches in financial reporting. Several different classes of machine learning and artificial intelligence algorithms may be employed to identify such mismatches. One such class of algorithms include Anomaly Detection Algorithms, such as Isolation Forest, One Class Support Vector Machine models, or Autoencoders. These algorithms are designed to identify unusual patterns of outliers in data, which could indicate discrepancies in financial reports.

Data Reconciliation Tools represent another class of algorithms that may used in some embodiments to identify mismatches. Such tools are specialized to identify and designed to reconcile discrepancies between datasets. Examples of Data Reconciliation Tools include Fuzzy Matching Algorithms and Rule-Based Matching.

Additional examples of potential tools for identifying mismatches in financial reporting may include Regression Analysis, Clustering Algorithms, Machine Learning Classification Models, and various Data Visualization Tools.

The first machine learning model, if used, may learn from journal entries created, confirmed, rejected, or rolled back for the full organization such that automatic journal entry creation decisions can be improved more efficiently for each entity and user.

Creation of Journal Entry to Resolve Mismatch

FIG. 4 shows an example user interface 400 displaying an example suggested journal entry that may be automatically created by the data management system for resolving a mismatch between two entities. In the example, the journal entry that is created balances the credit between the entities such that the variance is equal to zero. In the illustrated example, the UE 400 shows that the selected navigation item or module 402 is 'Consolidation Journals'. The data slice parameters 404 show the selected data slice parameters corresponding to the data in this journal entry. The journal details 406 shows the details of the journal entry.

In some embodiments, the journal entry and resolution strategy are guided using a second machine learning model or artificial intelligence tools. Such tools are generally specialized in using historical data and past user actions to predict future behavior and actions by the user. The tools may include, but are not limited to, Decision Tree Algorithms, Rules Based AI tools, Collaborative Filter, and Random Forrest Algorithms. Such tools may identify patterns in past data including the observation that during mismatches in intercompany reports, the Accounts Payable entity is often the source of error. The algorithms may then create a journal entry automatically that rectifies the discrepancy by adjusting the finances of Accounts Payable to match those of Accounts Receivable.

In addition to reconciling financial mismatches, the second machine learning model may also identify additional aspects of the users' behavior from past historical data. The second machine learning model may learn from journal entries created, confirmed, rejected, or values modified for the full organization such that decisions can be improved more efficiently for each entity and user. For instance, upon accepting a new journal entry, a user may need to request approval from a supervisor or adjust a ledger in accordance with the new financial data and journal entry. The second machine learning model may detect these approval requirements so that the tasks may be prepared for approval by the corresponding user(s) automatically.

In some embodiments, should the user choose to accept the journal entry created by a machine learning model, the journal entry may be saved automatically against a ledger of both entities involved, and/or the data management system may present a selectable option to save the journal entry. FIG. 4 shows the save button (e.g., second option described at block 114 of process 100B) depicted in the top right corner of the journal module of the user interface 400 for the data management system. Prior to saving the journal entry, the data management system provides an interface for users to make adjustments to any editable field in the journal entry and then a selectable option to save adjustments made. Although not shown, the UI 400 may also include a selectable option to roll back (e.g., delete) a draft journal entry (e.g., third option described at block 114 of process 100B).

Figure 5:
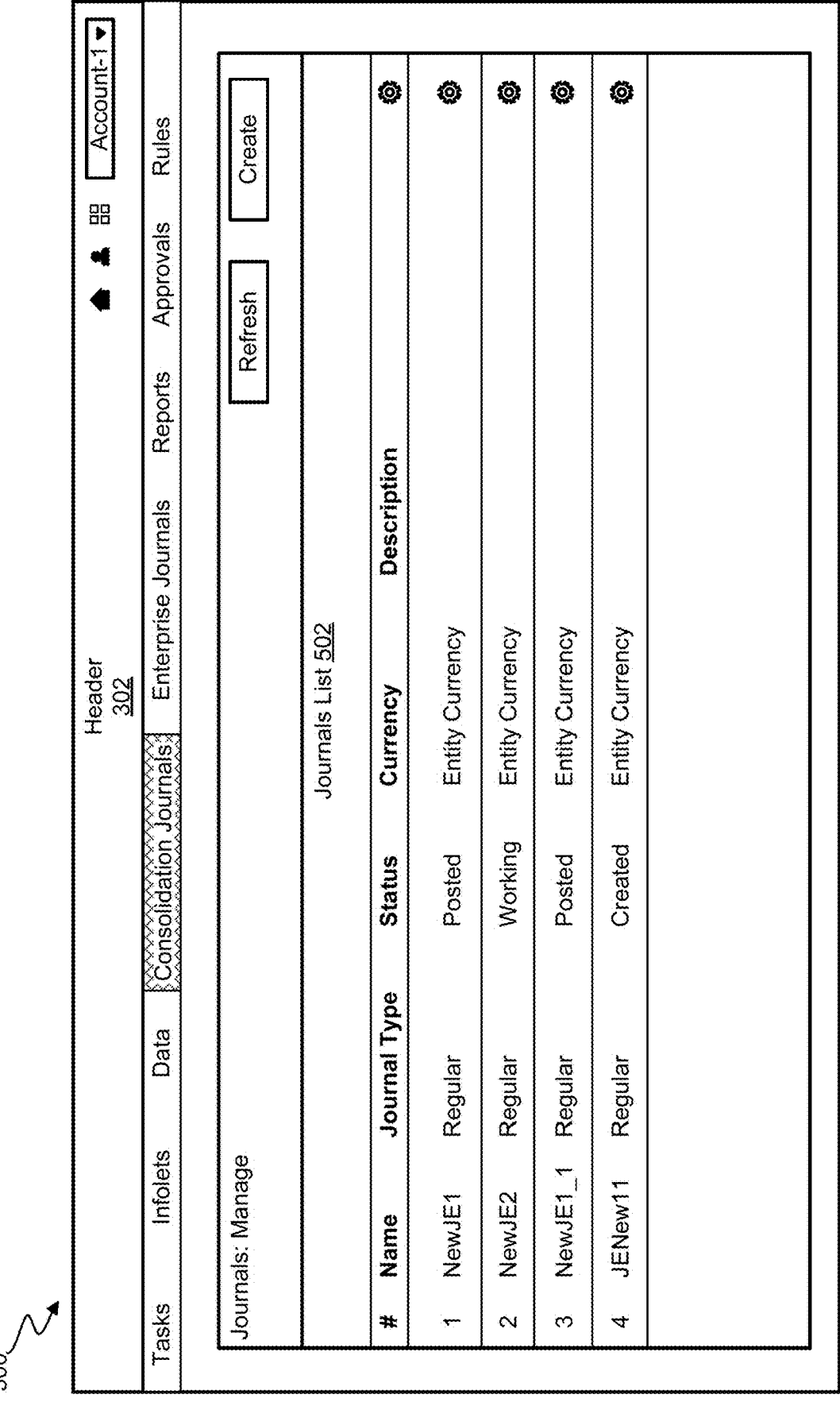
FIG. 5 shows an example interface showing an overview of the journals module in Oracle's Enterprise Performance Management (EPM) platform and the newly created journal entry from the example in FIG. 4 listed as Working (bottom row).

FIG. 5 shows an example user interface 500 showing an overview of a journals module from the data management system and a newly created journal entry listed as Working (bottom row of journals list 502). The journal entry is present and listed as Working in response to automatic creation and/or saving of the journal entry or based on user input saving the journal entry. In the event that user input is received to decline to save the journal entry (e.g., third option of block 114 of process 100B), the journal entry may be automatically deleted and removed from the record as if the journal entry (previously shown as created) never existed. For example, the fourth row shows an example new journal entry ('JENew11') that was created by the data management system (e.g., automatically generated using the machine learning model) but not yet saved or accepted. The status of Working signifies that the journal entry has been created and saved, but that the journal entry has not completed the workflow procedure.

Integration of Mismatch Reconciliation into the Data Management System

Figure 6:
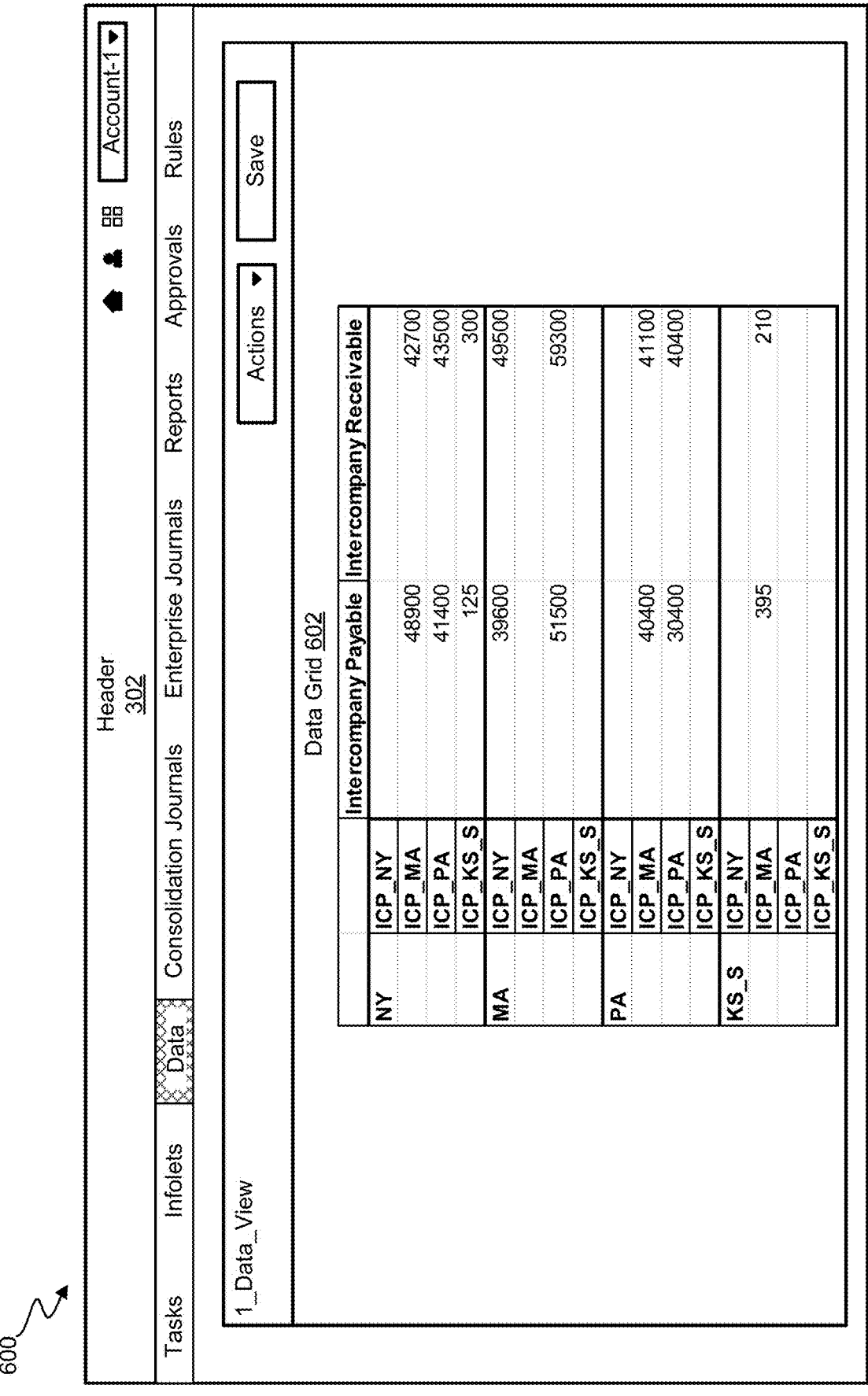
FIG. 6 shows an example interface showing how data may be stored to generate an intercompany matching report that shows a mismatch.

FIG. 6 illustrates an example user interface 600 that shows an example of how data may be stored to generate an intercompany matching report that shows a mismatch. FIG. 6 includes a data grid 602 which shows the data that comes from the ledger and may represent the source of the mismatch that is highlighted in an intercompany mismatch report. Here for instance, the second row for the entity NY shows the intercompany partner to be ICP_MA. The Account Payable for the entity NY with regards to ICP_MA is 48900. This represents the finances owed by NY to ICP_MA. FIG. 6 further shows that when MA is the primary entity and the partner is ICP_NY, the accounts receivable is 49500. This implies that the entity ICP_NY owes MA 49500. There is thus a mismatch and discrepancy between the two entities with regards to how much is owed by the entity NY to the entity MA. In some examples, the data grid 602 is configured to receive input from the user of the user interface 600 (e.g., to adjust one or more of the values in the data grid 602).

Stored heuristics, triggered conditions, user input, and/or a first machine learning model may use this form of data to identify possible mismatches in financial transactions between trading partners. When the second machine learning model causes automatic creation of an entry to clarify these mismatches, the user may also have the opportunity to correct the data entries in forms such as the one depicted in FIG. 6 to resolve not only the discrepancy via annotation, but the source data underlying the discrepancy.

User corrections on values received via the user interface may be fed back into the data management system and the second machine learning model as feedback to improve value prediction for the journal entries. User rollback of automatic creation of journal entries may be fed back into the data management system and the first machine learning model, if used, as feedback to improve determinations on when to automatically create journal entries, when to recommend automatic creation of journal entries, and when to not even recommend automatic creation of journal entries. The machine learning models may be updated based on the feedback to improve the efficiency and accuracy of decision making.

Computer System Architecture

Figure 7:
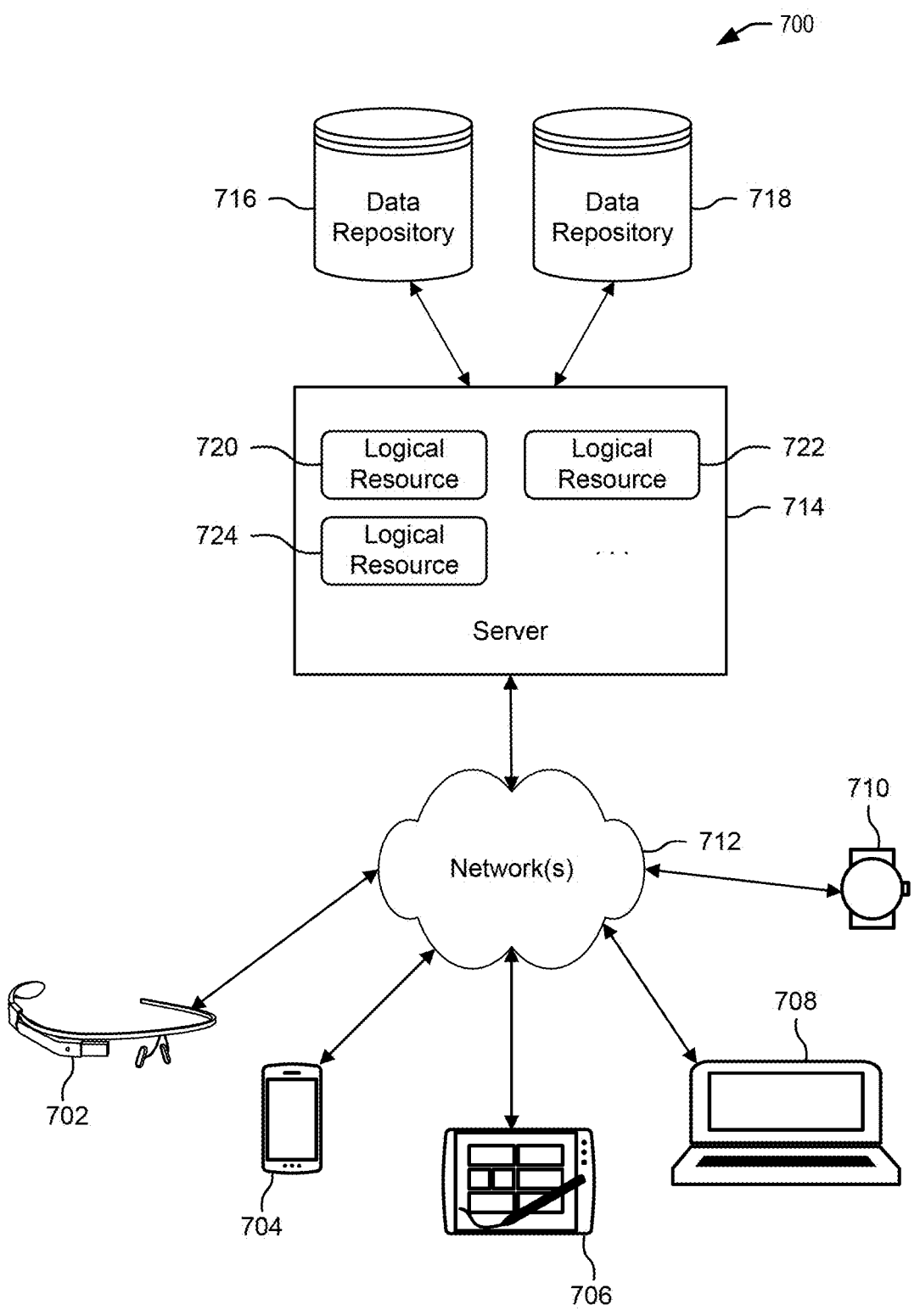
FIG. 7 depicts a simplified diagram of a distributed system for implementing certain aspects.

FIG. 7 depicts a simplified diagram of a distributed system 700 for implementing an embodiment. In the illustrated embodiment, distributed system 700 includes one or more client computing devices 702, 704, 706, 708, and/or 710 coupled to a server 714 via one or more communication networks 712. Clients computing devices 702, 704, 706, 708, and/or 710 may be configured to execute one or more applications.

In various aspects, server 714 may be adapted to run one or more services or software applications that enable techniques for automatically and intelligently creating journal entries to solve mismatches identified via the intercompany elimination reporting process.

In certain aspects, server 714 may also provide other services or software applications that can include non-virtual and virtual environments. In some aspects, these services may be offered as web-based or cloud services, such as under a Software as a Service (SaaS) model to the users of client computing devices 702, 704, 706, 708, and/or 710. Users operating client computing devices 702, 704, 706, 708, and/or 710 may in turn utilize one or more client applications to interact with server 714 to utilize the services provided by these components.

In the configuration depicted in FIG. 7, server 714 may include one or more components 720, 722 and 724 that implement the functions performed by server 714. These components may include software components that may be executed by one or more processors, hardware components, or combinations thereof. It should be appreciated that various different system configurations are possible, which may be different from distributed system 700. The embodiment shown in FIG. 7 is thus one example of a distributed system for implementing an embodiment system and is not intended to be limiting.

Users may use client computing devices 702, 704, 706, 708, and/or 710 for techniques for confirming automatically and intelligently created Journal entries or overriding automatically and intelligently created Journal entries to solve mismatches identified via the intercompany elimination reporting process in accordance with the teachings of this disclosure. A client device may provide an interface that enables a user of the client device to interact with the client device. The client device may also output information to the user via this interface. Although FIG. 7 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 712 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 712 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 714 may be composed of one or more general purpose computers, specialized server computers (including, by way of example, PC (personal computer) servers, UNIX® servers, LINUX® servers, mid-range servers, mainframe computers, rack-mounted servers, etc.), server farms, server clusters, a Real Application Cluster (RAC), database servers, or any other appropriate arrangement and/or combination. Server 714 can include one or more virtual machines running virtual operating systems, or other computing architectures involving virtualization such as one or more flexible pools of logical storage devices that can be virtualized to maintain virtual storage devices for the server. In various aspects, server 714 may be adapted to run one or more services or software applications that provide the functionality described in the foregoing disclosure.

The computing systems in server 714 may run one or more operating systems including any of those discussed above, as well as any commercially available server operating system. Server 714 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 714 may include one or more applications to analyze and consolidate data feeds and/or event updates received from users of client computing devices 702, 704, 706, 708, and/or 710. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 714 may also include one or more applications to display the data feeds and/or real-time events via one or more display devices of client computing devices 702, 704, 706, 708, and/or 710.

Distributed system 700 may also include one or more data repositories 716, 718. These data repositories may be used to store data and other information in certain aspects. For example, one or more of the data repositories 716, 718 may be used to store information for techniques for automatically and intelligently creating journal entries to solve mismatches identified via the intercompany elimination reporting process. Data repositories 716, 718 may reside in a variety of locations. For example, a data repository used by server 714 may be local to server 714 or may be remote from server 714 and in communication with server 714 via a network-based or dedicated connection. Data repositories 716, 718 may be of different types. In certain aspects, a data repository used by server 714 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 716, 718 may also be used by applications to store application data. The data repositories used by applications may be of different types such as, for example, a key-value store repository, an object store repository, or a general storage repository supported by a file system.

In one embodiment, server 714 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 8:
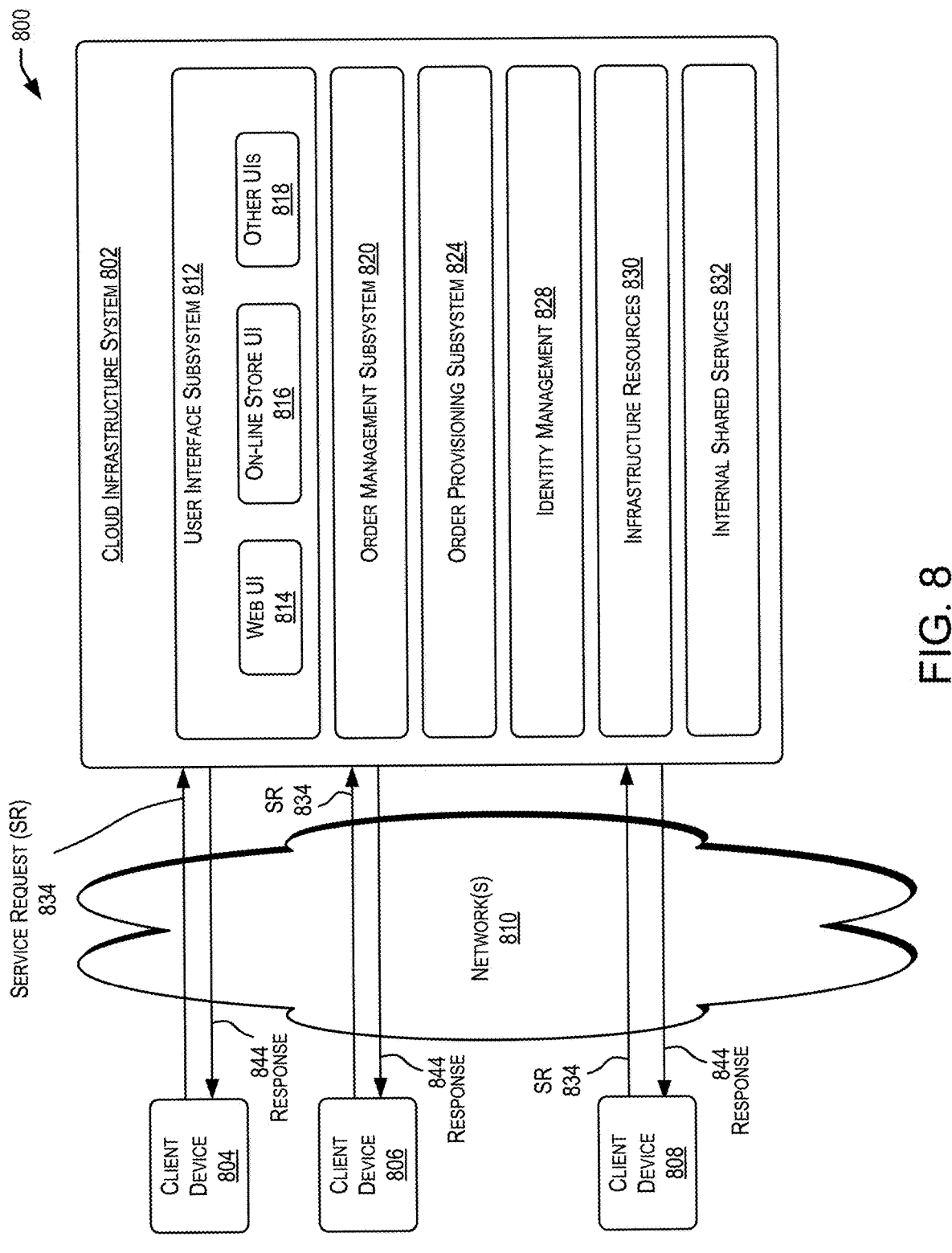
FIG. 8 is a simplified block diagram of one or more components of a system environment by which services provided by one or more components of an embodiment system may be offered as cloud services, in accordance with certain aspects.

FIG. 8 is a simplified block diagram of a cloud-based system environment in which automatically and intelligently creates journal entries to solve mismatches identified via the intercompany elimination reporting process, in accordance with certain aspects. In the embodiment depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 714. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The embodiment depicted in FIG. 8 is only one example of a cloud infrastructure system and is not intended to be limiting. It should be appreciated that, in some other aspects, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative aspects.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 810 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 802 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 802 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 802. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 802. Cloud infrastructure system 802 then performs processing to provide the services requested in the tenant's subscription order. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public tenant, where the tenant can be an individual or an enterprise. In certain other aspects, under a private cloud model, cloud infrastructure system 802 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 802 and the services provided may be shared by several organizations in a related community. Various other models such as hybrids of the above mentioned models may also be used.

Client computing devices 804, 806, and 808 may be of different types (such as devices 702, 704, 706, and 708 depicted in FIG. 7) and may be capable of operating one or more client applications. A user may use a client device to interact with cloud infrastructure system 802, such as to request a service provided by cloud infrastructure system 802.

In some aspects, the processing performed by cloud infrastructure system 802 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 802 for determining the intent of an utterance. The data used for this analysis may include structured data (e.g., data stored in a database or structured according to a structured model) and/or unstructured data (e.g., data blobs (binary large objects)).

As depicted in the embodiment in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like.

In certain aspects, to facilitate efficient provisioning of these resources for supporting the various cloud services provided by cloud infrastructure system 802 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a tenant may, using a client device, request (service request 834) one or more services provided by cloud infrastructure system 802 using one or more of interfaces 814, 816, and 818. For example, a tenant may access the online store, browse cloud services offered by cloud infrastructure system 802, and place a subscription order for one or more services offered by cloud infrastructure system 802 that the tenant wishes to subscribe to. The service request may include information identifying the tenant and one or more services that the tenant desires to subscribe to. For example, a tenant may place a subscription order for a chatbot related service offered by cloud infrastructure system 802. As part of the order, the client may provide information identifying the input (e.g. utterances).

In certain aspects, such as the embodiment depicted in FIG. 8, cloud infrastructure system 802 may comprise an order management subsystem (OMS) 820 that is configured to process the new order. As part of this processing, OMS 820 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 802 may send a response or notification 844 to the requesting tenant to indicate when the requested service is now ready for use. In some instances, information (e.g., a link) may be sent to the tenant that enables the tenant to start using and availing the benefits of the requested services.

Cloud infrastructure system 802 may provide services to multiple tenants. For each tenant, cloud infrastructure system 802 is responsible for managing information related to one or more subscription orders received from the tenant, maintaining tenant data related to the orders, and providing the requested services to the tenant or clients of the tenant. Cloud infrastructure system 802 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 802 may provide services to multiple tenants in parallel. Cloud infrastructure system 802 may store information for these tenants, including possibly proprietary information. In certain aspects, cloud infrastructure system 802 comprises an identity management subsystem (IMS) 828 that is configured to manage tenant's information and provide the separation of the managed information such that information related to one tenant is not accessible by another tenant. IMS 828 may be configured to provide various security-related services such as identity services, such as information access management, authentication and authorization services, services for managing tenant identities and roles and related capabilities, and the like.

Figure 9:
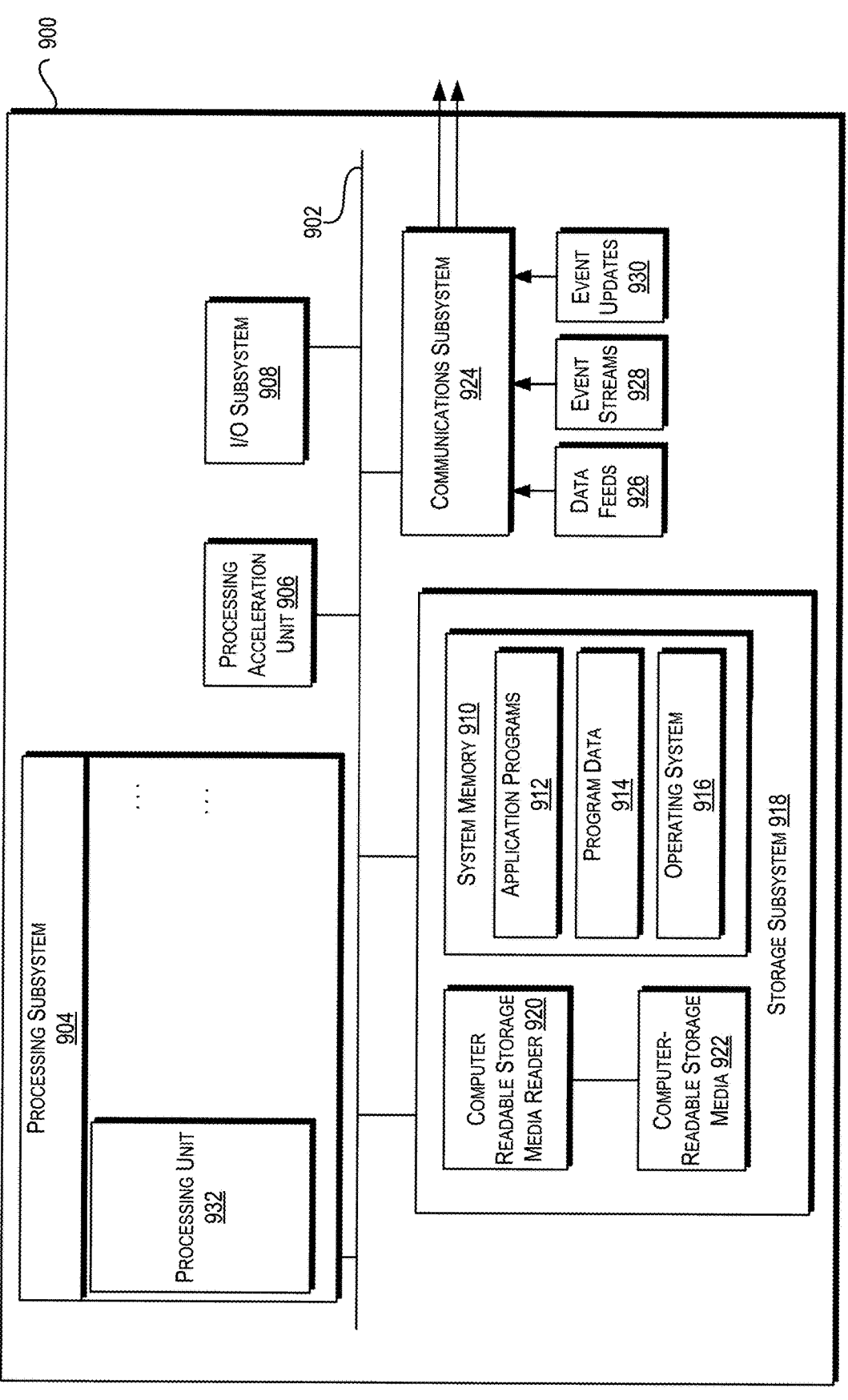
FIG. 9 illustrates an example computer system that may be used to implement certain aspects.

FIG. 9 illustrates an exemplary computer system 900 that may be used to implement certain aspects. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative aspects of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may be single core or multicore processors. The processing resources of computer system 900 can be organized into one or more processing units 932, 934, etc. A processing unit may include one or more processors, one or more cores from the same or different processors, a combination of cores and processors, or other combinations of cores and processors. In some aspects, processing subsystem 904 can include one or more special purpose co-processors such as graphics processors, digital signal processors (DSPs), or the like. In some aspects, some or all of the processing units of processing subsystem 904 can be implemented using customized circuits, such as application specific integrated circuits (ASICs), or field programmable gate arrays (FPGAs).

In some aspects, the processing units in processing subsystem 904 can execute instructions stored in system memory 910 or on computer readable storage media 922. In various aspects, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above. In instances where computer system 900 is executing one or more virtual machines, one or more processing units may be allocated to each virtual machine.

In certain aspects, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some aspects. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide a repository for storing data used in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 922 may store programming and data constructs that provide the functionality of some aspects. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, digital video disc (DVD), a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 918 may also include a computer-readable storage media reader 920 that can further be connected to computer-readable storage media 922. Reader 920 may receive and be configured to read data from a memory device such as a disk, a flash drive, etc.

In certain aspects, computer system 900 may support virtualization technologies, including but not limited to virtualization of processing and memory resources. For example, computer system 900 may provide support for executing one or more virtual machines. In certain aspects, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, the communications subsystem may be used to transmit a response to a user regarding the inquiry for a chatbot.

Communications subsystem 924 may support both wired and/or wireless communication protocols. For example, in certain aspects, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 924 can provide wired network connectivity (e.g., Ethernet) in addition to or instead of a wireless interface.

Communications subsystem 924 can receive and transmit data in various forms. For example, in some aspects, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:

training a machine learning model to learn relationships between journal entries associated with adjacent reporting periods and generate journal entries that reconcile discrepancies based at least in part on certain characteristics of historical journal entries associated with historical discrepancies;

accessing a first data structure from a first source comprising a first plurality of data entries against one or more first entities and one or more second entities; wherein the first data structure and the first source are associated with the one or more first entities;

accessing a second data structure from a second source comprising a second plurality of data entries against one or more third entities and one or more fourth entities;

wherein the second data structure and the second source are associated with the one or more third entities;

automatically detecting, based at least in part on one or more first characteristics of one or more first data entries of the first plurality of data entries and one or more second characteristics of one or more second data entries of the second plurality of data entries, a first discrepancy between the one or more first data entries and the one or more second data entries and a second discrepancy between one or more other first data entries of the first plurality of data entries and one or more other second data entries of the second plurality of data entries;

receiving a selection of a first option to analyze discrepancies between the first plurality of data entries and the second plurality of data entries;

in response to the selection of the first option to analyze the discrepancies and without selection of individual discrepancies, using the machine learning model to automatically generate a first journal entry that reconciles the first discrepancy by recording a first ledger acknowledging, to the one or more first entities, the first discrepancy in alignment with the one or more second data entries, and automatically cause displaying of a second option to confirm generation of the first journal entry and a third option to roll back generation of the first journal entry;

automatically generating a second journal entry that reconciles the second discrepancy by recording a second ledger acknowledging the second discrepancy in alignment with the one or more other first data entries;

wherein selection of the third option is operable to cause deletion of the first journal entry as if the first journal entry never existed in the first data structure;

in response to a selection of the second option to confirm generation of the first journal entry, automatically persisting the first journal entry in the first data structure; wherein automatically persisting the first journal entry comprises automatically posting the first journal entry to adjust balances in the first data structure.

2. The computer-implemented method of claim 1, wherein the one or more third entities are the one or more second entities, and wherein the one or more fourth entities are the one or more first entities.

3. The computer-implemented method of claim 1, wherein the one or more third entities are the one or more second entities, and wherein the one or more fourth entities are different than the one or more first entities and the one or more second entities.

4. The computer-implemented method of claim 1, wherein the one or more first entities comprise a plurality of first entities having a same parent entity, and wherein the first data structure is maintained for the parent entity.

5. The computer-implemented method of claim 1, wherein the automatically generating the second journal entry is by using the machine learning model.

6. The computer-implemented method of claim 1, wherein the training the machine learning model is further based on currency exchange rates at historical times associated with the historical journal entries.

7. The computer-implemented method of claim 1, wherein the certain characteristics of the historical journal entries include a characteristic that indicates whether a respective historical journal entry was accepted or rejected.

8. The computer-implemented method of claim 1, wherein the certain characteristics of the historical journal entries include a characteristic that indicates an extent to which a respective historical journal entry is modified prior to being persisted in the first data structure or the second data structure.

9. The computer-implemented method of claim 1, wherein the certain characteristics of the historical journal entries include a characteristic that indicates a seasonality of the historical journal entries.

10. A computer-program product comprising one or more non-transitory machine-readable storage media, including stored instructions configured to cause a computing system to perform a set of actions including:

training a machine learning model to learn relationships between journal entries associated with adjacent reporting periods and generate journal entries that reconcile discrepancies based at least in part on certain characteristics of historical journal entries associated with historical discrepancies;

accessing a first data structure from a first source comprising a first plurality of data entries against one or more first entities and one or more second entities; wherein the first data structure and the first source are associated with the one or more first entities;

accessing a second data structure from a second source comprising a second plurality of data entries against one or more third entities and one or more fourth entities;

wherein the second data structure and the second source are associated with the one or more third entities;

automatically detecting, based at least in part on one or more first characteristics of one or more first data entries of the first plurality of data entries and one or more second characteristics of one or more second data entries of the second plurality of data entries, a first discrepancy between the one or more first data entries and the one or more second data entries and a second discrepancy between one or more other first data entries of the first plurality of data entries and one or more other second data entries of the second plurality of data entries;

receiving a selection of a first option to analyze discrepancies between the first plurality of data entries and the second plurality of data entries;

in response to the selection of the first option to analyze the discrepancies and without selection of individual discrepancies, using the machine learning model to automatically generate a first journal entry that reconciles the first discrepancy by recording a first ledger acknowledging, to the one or more first entities, the first discrepancy in alignment with the one or more second data entries, and automatically cause displaying of a second option to confirm generation of the first journal entry and a third option to roll back generation of the first journal entry;

automatically generating a second journal entry that reconciles the second discrepancy by recording a second ledger acknowledging the second discrepancy in alignment with the one or more other first data entries;

wherein selection of the third option is operable to cause deletion of the first journal entry as if the first journal entry never existed in the first data structure;

in response to a selection of the second option to confirm generation of the first journal entry, automatically persisting the first journal entry in the first data structure; wherein automatically persisting the first journal entry comprises automatically posting the first journal entry to adjust balances in the first data structure.

11. The computer-program product of claim 10, wherein the one or more third entities are the one or more second entities, and wherein the one or more fourth entities are the one or more first entities.

12. The computer-program product of claim 10, wherein the one or more third entities are the one or more second entities, and wherein the one or more fourth entities are different than the one or more first entities and the one or more second entities.

13. The computer-program product of claim 10, wherein the one or more first entities comprise a plurality of first entities having a same parent entity, and wherein the first data structure is maintained for the parent entity.

14. The computer-program product of claim 10, wherein the automatically generating the second journal entry is by using the machine learning model.

15. A system comprising:

one or more processors;

one or more non-transitory computer-readable media storing instructions, which, when executed by the system, cause the system to perform a set of actions including:

training a machine learning model to learn relationships between journal entries associated with adjacent reporting periods and generate journal entries that reconcile discrepancies based at least in part on certain characteristics of historical journal entries associated with historical discrepancies;

accessing a first data structure from a first source comprising a first plurality of data entries against one or more first entities and one or more second entities; wherein the first data structure and the first source are associated with the one or more first entities;

accessing a second data structure from a second source comprising a second plurality of data entries against one or more third entities and one or more fourth entities;

wherein the second data structure and the second source are associated with the one or more third entities;

automatically detect, based at least in part on one or more first characteristics of one or more first data entries of the first plurality of data entries and one or more second characteristics of one or more second data entries of the second plurality of data entries, a first discrepancy between the one or more first data entries and the one or more second data entries and a second discrepancy between one or more other first data entries of the first plurality of data entries and one or more other second data entries of the second plurality of data entries;

receiving a selection of a first option to analyze discrepancies between the first plurality of data entries and the second plurality of data entries;

in response to the selection of the first option to analyze the discrepancies and without selection of individual discrepancies, using the machine learning model to automatically generate a first journal entry that reconciles the first discrepancy by recording a first ledger acknowledging, to the one or more first entities, the first discrepancy in alignment with the one or more second data entries, and automatically cause displaying of a second option to confirm generation of the first journal entry and a third option to roll back generation of the first journal entry;

automatically generating a second journal entry that reconciles the second discrepancy by recording a second ledger acknowledging the second discrepancy in alignment with the one or more other first data entries;

wherein selection of the third option is operable to cause deletion of the first journal entry as if the first journal entry never existed in the first data structure;

in response to a selection of the second option to confirm generation of the first journal entry, automatically persisting the first journal entry in the first data structure;

wherein automatically persisting the first journal entry comprises automatically posting the first journal entry to adjust balances in the first data structure.

16. The system of claim 15, wherein the training the machine learning model is further based on currency exchange rates at historical times associated with the historical journal entries.

17. The system of claim 15, wherein the certain characteristics of the historical journal entries include a characteristic that indicates whether a respective historical journal entry was accepted or rejected.

18. The system of claim 15, wherein the certain characteristics of the historical journal entries include a characteristic that indicates an extent to which a respective historical journal entry is modified prior to being persisted in the first data structure or the second data structure.

19. The system of claim 15, wherein the certain characteristics of the historical journal entries include a characteristic that indicates a seasonality of the historical journal entries.

\* \* \* \* \*